(12) United States Patent
Ephraim et al.

(10) Patent No.: US 8,964,633 B2
(45) Date of Patent: Feb. 24, 2015

(54) METHOD, APPARATUS, AND COMPUTER PROGRAM PRODUCT FOR AUTHENTICATING SUBSCRIBER COMMUNICATIONS AT A NETWORK SERVER

(75) Inventors: Robert M. Ephraim, Bridgewater, NJ (US); Fangqiu Tu, Caldwell, NJ (US); Rohit Satish Kalbag, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1180 days.

(21) Appl. No.: 11/678,128

(22) Filed: Feb. 23, 2007

(65) Prior Publication Data
US 2008/0209522 A1    Aug. 28, 2008

(51) Int. Cl.
*H04W 4/00* (2009.01)
*H04L 29/06* (2006.01)
*H04M 1/66* (2006.01)
*H04M 3/42* (2006.01)
*G06F 7/04* (2006.01)

(52) U.S. Cl.
CPC ............ *H04L 65/1069* (2013.01); *H04L 63/08* (2013.01); *H04L 63/1441* (2013.01); *H04L 65/1006* (2013.01); *H04L 65/1073* (2013.01)
USPC ........... 370/328; 455/410; 455/411; 455/415; 726/4

(58) Field of Classification Search
USPC ................ 455/410, 411, 415; 370/328; 726/4
See application file for complete search history.

(56) References Cited

U.S. PATENT DOCUMENTS

| | | | |
|---|---|---|---|
| 6,957,066 B1* | 10/2005 | Stammers et al. ......... | 455/435.1 |
| 2003/0012159 A1* | 1/2003 | Vassilovski et al. .......... | 370/335 |
| 2004/0005886 A1* | 1/2004 | Oda et al. ................... | 455/422.1 |
| 2004/0152446 A1 | 8/2004 | Saunders et al. | |
| 2004/0209597 A1* | 10/2004 | Myles et al. .................. | 455/410 |
| 2004/0266415 A1* | 12/2004 | Belkin et al. .................. | 455/415 |
| 2005/0239445 A1* | 10/2005 | Karaoguz et al. .......... | 455/414.1 |

* cited by examiner

*Primary Examiner* — Kent Chang
*Assistant Examiner* — Chayce Bibbee

(57) ABSTRACT

An apparatus for authenticating subscriber communications at a network server includes a determining element and an identification element in communication with the determining element. The determining element may be configured to receive an incoming message. The identification extractor may be configured to extract a device identifier and an address identifier from the incoming message. The determining element may be further configured to determine whether the device identifier and the address identifier of the incoming message match both a registered device identifier and a registered address identifier associated with the registered device identifier, respectively.

18 Claims, 5 Drawing Sheets

METHOD, APPARATUS, AND COMPUTER PROGRAM PRODUCT FOR AUTHENTICATING SUBSCRIBER COMMUNICATIONS AT A NETWORK SERVER

TECHNOLOGICAL FIELD

Embodiments of the present invention relate generally to authentication techniques, and, more particularly, relate to a method, apparatus, and computer program product for providing authentication for a service subscriber at a server within a network.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to the establishment of communication sessions during which, for example, Internet telephone calls, multimedia distribution, multimedia conferences and the like may be established. One particular protocol for setting up such sessions is the Session Initiation Protocol (SIP).

SIP is an application-layer control (signaling) protocol for creating, modifying, and terminating sessions with one or more participants. SIP is widely used as a signaling protocol for Voice over Internet Protocol (VoIP) and media sharing applications. SIP is addressing neutral, with addresses expressed as a uniform resource locator (URL), a uniform resource identifier (URI), a telephone number, an email like address, or the like. SIP is generally considered to be lightweight since it has a limited number of methods to reduce complexity, and transport-independent since it can be used with User Datagram Protocol (UDP), Transport Control Protocol (TCP) and other transport protocols.

SIP clients may use, for example, TCP or UDP to connect to a SIP server and/or other SIP endpoints. As such, SIP may be used in setting up and tearing down voice or video calls or in any application where session initiation is employed. SIP, therefore, provides a signaling and call setup protocol for IP-based communications that can support a superset of call processing functions and features present in the public switched telephone network (PSTN).

SIP is a peer-to-peer protocol which works in concert with several other protocols and is typically only involved in the signaling portion of a communication session. SIP invitations are used to create sessions and SIP signaling is used to carry session descriptions that allow participants to agree on a set of compatible media types. SIP servers, or proxy servers, may help route requests to users, implement provider call-routing policies, provide features to users, etc. SIP also provides a registration function to allow users to upload their current locations to the proxy server.

With respect to SIP sessions and other services which may be provided over a network, it is common for subscriber authentications to be performed by the network instead of by SIP servers or some other servers associated with various different services. For example, a transport network such as a radio access network (RAN), a packet data serving node (PDSN), an authentication, authorization, and accounting (AAA) server or the like, may provide authentication for network access. Accordingly, once a particular subscriber passes the network authentication, the subscriber can access, for example, the SIP server as long as the mobile device number (MDN) of the device being used to access the server is stored in the server's database.

The lack of authentication at the server itself may cause problems with regard to security. For example, a hacker could obtain subscriber information using SIP signaling messages. If the hacker is able to obtain a valid MDN, i.e., an MDN that has been authenticated by the network, the hacker could use an in-network device and purport to be associated with the MDN to access information about the subscriber who is legitimately associated with the MDN including contact information including other valid MDNs. Additionally, the hacker could launch a denial of service attack by pinging the SIP server with SIP signaling messages that appear to be from valid MDNs. Since the server may attempt to respond to each "valid" message, the server, and possibly other network resources, may be overloaded. Additionally, having gained valid MDNs, the hacker may attempt to perform other types of damage.

Accordingly, it may be desirable to provide a mechanism by which to reduce the vulnerability of servers and other network resources to the attacks described above.

BRIEF SUMMARY

A method, apparatus and computer program product are therefore provided for authenticating subscribers at a server providing a network service. In particular, a method, apparatus and computer program product are provided that may hinder hackers from obtaining "valid" MDNs and using them inappropriately. In this regard, embodiments of the present invention may enable network servers, such as SIP servers, to provide authentication of subscriber communications using signaling protocol (e.g., SIP signaling protocol) for multimedia based applications over a network such as a cellular network. Messages that are not authenticated at the server may be ignored so that system resources are not consumed. Accordingly an impact of unauthorized individuals attempting to launch denial of service or other attacks on network resources may also be reduced.

In one exemplary embodiment, a method of authenticating subscriber communications at a network server is provided. The method may include receiving an incoming message, extracting a device identifier and an address identifier from the incoming message, and determining whether the device identifier and the address identifier of the incoming message match both a registered device identifier and a registered address identifier associated with the registered device identifier, respectively.

In another exemplary embodiment, a computer program product for authenticating subscriber communications at a network server is provided. The computer program product includes at least one computer-readable storage medium having computer-readable program code portions stored therein. The computer-readable program code portions may include first, second and third executable portions. The first executable portion is for receiving an incoming message. The second executable portion is for extracting a device identifier and an address identifier from the incoming message. The third executable portion is for determining whether the device identifier and the address identifier of the incoming message match both a registered device identifier and a registered address identifier associated with the registered device identifier, respectively.

In another exemplary embodiment, an apparatus for authenticating subscriber communications at a network server is provided. The apparatus may include a determining element and an identification element in communication with the determining element. The determining element may be configured to receive an incoming message. The identification extractor may be configured to extract a device identifier and an address identifier from the incoming message. The determining element may be further configured to determine whether the device identifier and the address identifier of the incoming message match both a registered device identifier and a registered address identifier associated with the registered device identifier, respectively.

Embodiments of the invention may provide a method, apparatus and computer program product for authenticating subscriber communications at a network server. As a result, for example, networks, network resources and users of services associated with establishment of communication sessions such as SIP sessions may experience less vulnerability with respect to information used to setup the communication sessions.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of certain embodiments may take the form of web-implemented computer software. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
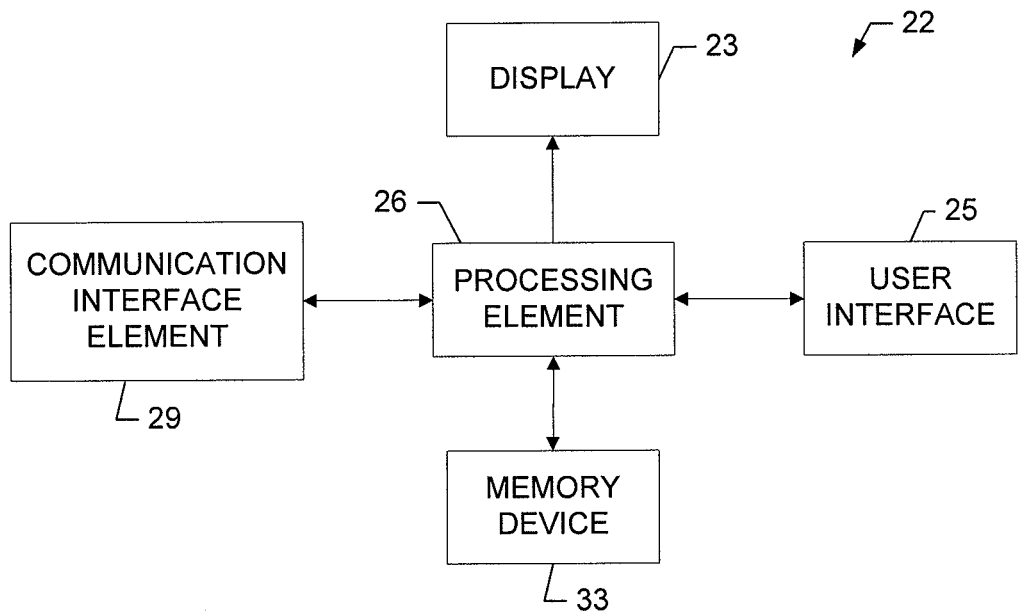
FIG. 1 is a schematic block diagram of a mobile terminal according to an exemplary embodiment of the present invention.

FIG. 1 is a schematic block diagram of a mobile terminal or network component which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. Types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention.

As shown in FIG. 1, in addition to a display 23 (which may be omitted for certain network components) and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users via a session such as a Session Initiation Protocol (SIP) session. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
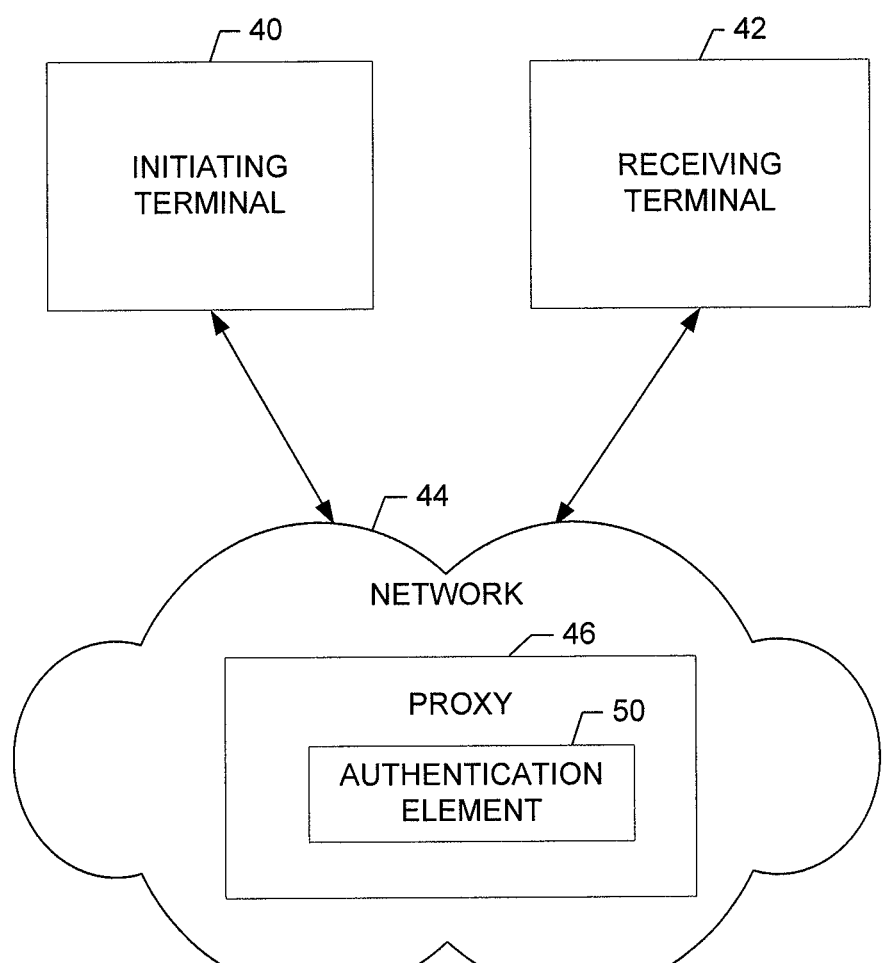
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) although other communication sessions may also be established. As such, FIG. 2 is a simplified schematic diagram illustrating a system capable of supporting communication between network nodes such as an initiating terminal 40 and a receiving terminal 42 between which a session may be provided in connection with SIP communications via a network 44. In this regard, it should be noted that the network 44 may include any combination of wireless or wired networks such as, for example, private networks, cellular networks, public networks, etc. The network 44 may include at least one proxy 46, which may be associated with, for example, the network nodes of the network 44. The proxy 46 may be capable of receiving and forwarding SIP signaling messages and/or messages from another protocol used for session setup. In an exemplary embodiment, the proxy 46 may be a server or other computing device configured to enable communication of messages, such as SIP signaling messages, to and/or from the initiating terminal 40 and the receiving terminal 42. As such, the proxy 46 may also include elements similar to those of the mobile terminal 22 described in reference to FIG. 1, except that the proxy 46 may not include the display 23. Although signals will be described hereinafter as passing between the initiating and receiving terminals 40 and 42, it should be understood that such signals are communicated via the network 44 and also via the at least one proxy 46 where applicable. It should also be understood that the initiating and receiving terminals 40 and 42 may be examples of the mobile terminal 22 of FIG. 1, or any other suitable communications device.

SIP could be thought to enable, for example, alerting the receiving terminal 42 of a session invitation such as a voice over IP based voice call from the initiating terminal 40. For example, an SIP INVITE message could be used to announce a call to the receiving terminal 42. In a typical SIP call setup sequence, the receiving terminal 42 may provide a response to the initiating terminal 40 indicating acceptance of the invitation. The initiating terminal 40 may then acknowledge the response from the receiving terminal 42, prior to commencement of communications associated with the voice call itself. Many other types of signaling messages are also possible such as, NOTIFY, SUBSCRIBE, ACK, CANCEL, INFO, BYE, 100 TRYING, 180 RINGING, 200 OK, 403, 420, 480, 500, etc.

As stated above, a conventional SIP server may allow any authenticated user on the network to access the SIP server as long as the user presents a valid MDN to the SIP server. Embodiments of the present invention enable SIP server (e.g., the proxy 46) authentication of each received SIP protocol message other than a SIP REGISTER message, regardless of the validity of the MDN, as will be seen below. Accordingly, embodiments of the present invention may include an authentication element 50 disposed at the proxy 46. The authentication element 50 may be configured, as described in greater detail below, to extract information from each received SIP protocol message to enable authentication of the message based on a device identifier (e.g., a MDN or a mobile identification number (MIN)) and an address identifier (e.g., a IP address of the device sending the message) provided in the message. If the message includes a device identifier and address identifier that match identifiers stored when a particular user associated with the device identifier or the address identifier registered, the message may be authenticated. However, if the message includes a device identifier and address identifier that do not match identifiers stored when the particular user associated with the device identifier or the address identifier registered, the message may not be authenticated and, for example, the message may be ignored.

Figure 3:
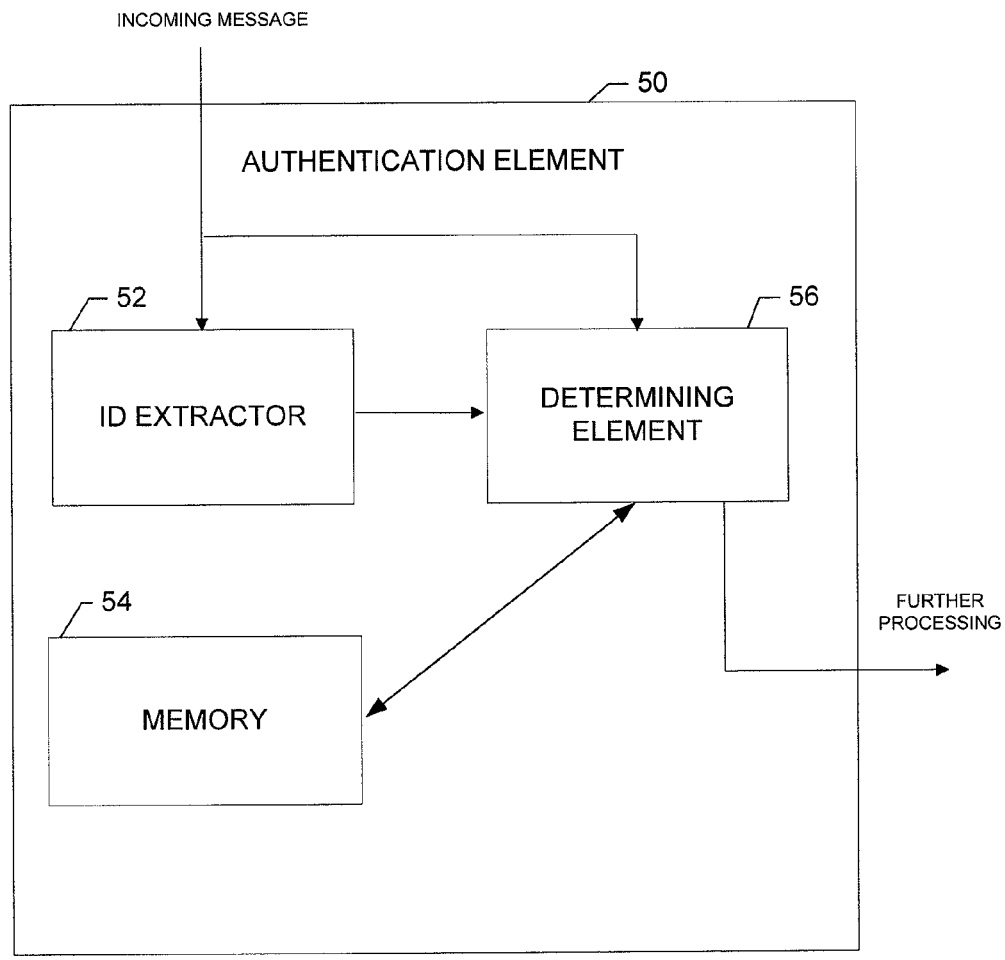
FIG. 3 is a schematic block diagram illustrating an authentication element according to an exemplary embodiment of the present invention.

FIG. 3 is a schematic block diagram illustrating the authentication element 50 according to an exemplary embodiment. The authentication element 50 may be embodied as any device or means embodied in either hardware, software, or a combination of hardware and software that is configured to authenticate subscriber communications at a network server. In this regard, the authentication element 50 may be configured to extract information from protocol messages, such as SIP signaling messages, in order to authenticate the messages at a network component such as the proxy 46 or another server based on the extracted information. The authentication element 50 may perform the authentication based on extracted address and device identifier information from each message other than a registration message such as a SIP REGISTER message. Meanwhile, the authentication element 50 may be configured to extract information from the registration message for storage and comparison to extracted information from other types of messages in order to enable a comparison of the extracted information from the other types of messages to the extracted information from the registration message for authentication determinations.

In an exemplary embodiment, the authentication element 50 may include an ID extractor 52, a memory 54 capable of storing information, for example, in one or more databases. The authentication element 50 may also include a determining element 56 configured to make determinations with respect to message type and determinations with respect to authentication of messages. Each of the ID extractor 52, the memory 54, and the determining element 56 may be operated under the control of, or otherwise embodied as, a processor of the proxy 46 such as the processing element 26 of FIG. 1.

The ID extractor 52 may be embodied as any device or means embodied in either hardware, software, or a combination of hardware and software that is configured to receive input protocol messages, such as SIP signaling messages, and extract information from the protocol messages. In an exemplary embodiment, the ID extractor 52 may be configured to extract a device identifier and an address identifier from each incoming protocol message. For example, the device identifier could be a MDN and/or an MIN associated with the device sending the protocol message to the proxy 46. The address identifier could be, for example, an internet protocol (IP) address of the device sending the protocol message to the proxy 46 (e.g., the source IP address). The memory 54 may include, for example, volatile or non-volatile memory and could be the memory device 33 of FIG. 1. Since a new source IP address is typically dynamically assigned to a valid client device each time during power up or other session establishment events, it will be difficult for a hacker to obtain both a valid MDN and its corresponding valid registration address identifier.

The determining element 56 may be embodied as any device or means embodied in either hardware, software, or a combination of hardware and software that is configured to receive extracted information from the ID extractor 52 and, based on the type of the protocol message (e.g., registration message or other type of message), the determining element 56 may either store information to or access information from the memory 54. As such, the determining element 56 may be configured to make an initial determination regarding the type of incoming message. In this regard, the determining element 56 may be configured to distinguish between incoming registration messages and other types of incoming messages.

Figure 4:
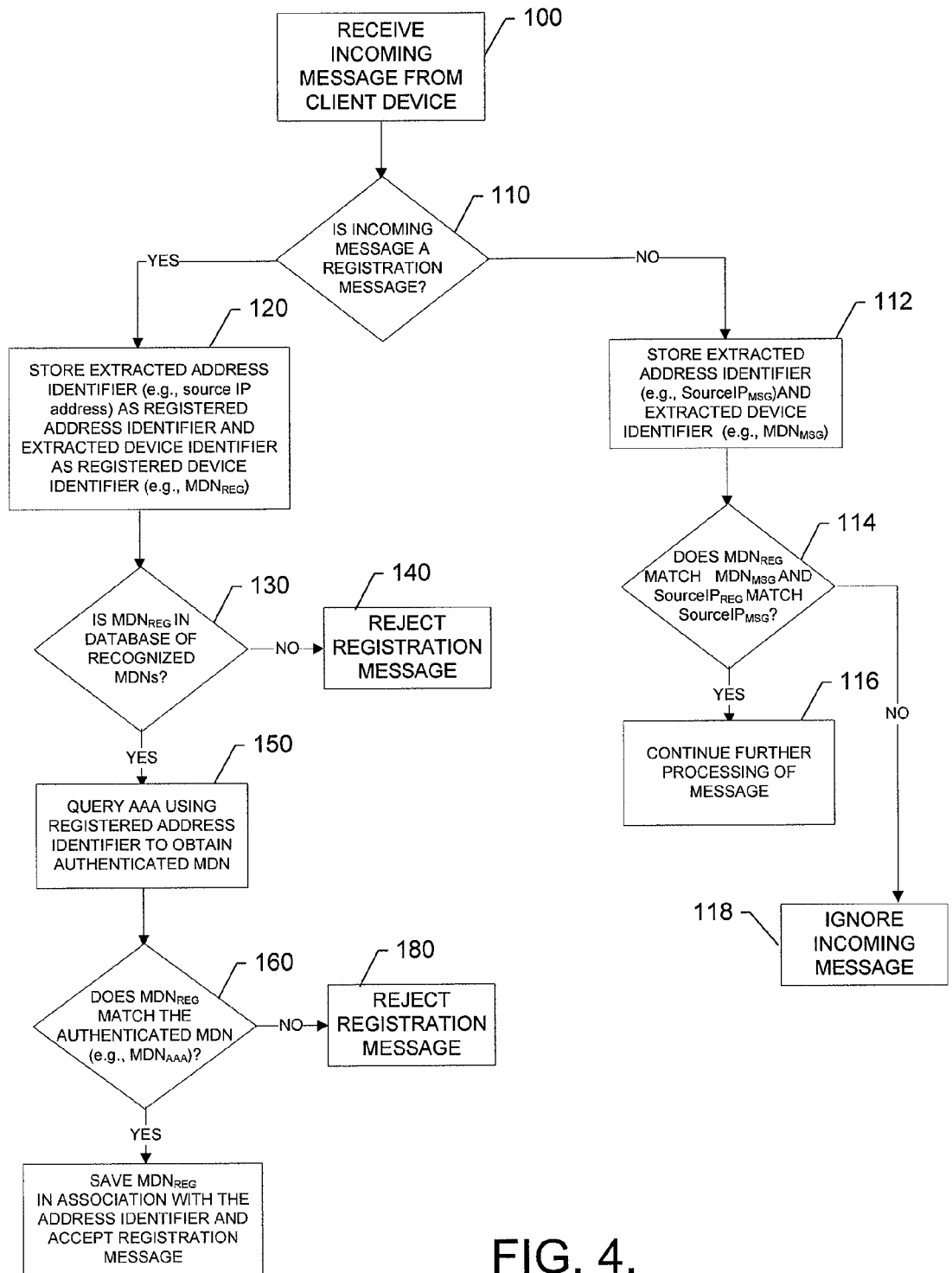
FIG. 4 is a flowchart illustrating operation of a determining element in accordance with an exemplary embodiment.

FIG. 4 is a flowchart illustrating operation of the determining element 56 in accordance with an exemplary embodiment. At operation 100, the determining element 56 receives a protocol message such as a SIP signaling message from a client (e.g., the initiating terminal 40). The determining element 56 then determines whether the incoming message is a registration message or another type of message at operation 110. If the protocol message received is a registration message (e.g., a SIP REGISTER message), the determining element 56 may be configured to store the device identifier and the address identifier in the memory 54 at operation 120. The device identifier and address identifier may have been extracted by the ID extractor 52. In an exemplary embodiment, the device identifier (e.g., MIN and/or MDN) and the address identifier (e.g., source IP address) may be stored in corresponding registered device and registered address databases, respectively.

The device identifier of an incoming registration message (e.g., $MDN_{reg}$) may be compared to previously stored device identifiers in the memory 54 or in another server database accessible to the determining element 56 at operation 130. If the device identifier of the incoming registration message is not found in the memory 54 or other server database, the registration message may be ignored or rejected at operation 140. Meanwhile, if the device identifier of the incoming registration message is found in the memory 54 or other server database, an authentication server (e.g., a AAA server) may be queried using the registered address identifier (e.g., $SourceIP_{reg}$) to obtain an authentic device identifier (e.g., $MDN_{AAA}$) that may be associated with the registered address identifier (e.g., $SourceIP_{reg}$) at operation 150. A determination may be made as to whether the registered device identifier extracted from the incoming registration message matches the authentic device identifier at operation 160. If the registered device identifier extracted from the incoming registration message matches the authentic device identifier associated with the address identifier (e.g., the source IP address), the registered device identifier from the incoming registration message may be stored in association with the registered address identifier and the registration message may be accepted at operation 170. However, if the registered device identifier extracted from the incoming registration message does not match the authentic device identifier associated with the registered address identifier (e.g., the source IP address), the device identifier from the incoming registration message may be rejected or ignored at operation 180.

If the incoming message is not a registration message, the address identifier (e.g., $SourceIP_{MSG}$) and device identifier (e.g., $MDN_{MSG}$) of the incoming message may be stored to corresponding (or the same) databases at operation 112. The address identifier (e.g., $SourceIP_{MSG}$) and device identifier (e.g., $MDN_{MSG}$) may have been extracted by the ID extractor 52. The determining element 56 may then be configured to compare the address identifier and device identifier of the incoming message to registered address and device identifiers at operation 114. If both the address identifier and the device identifier of the incoming message match an associated registered address identifier and registered device identifier, respectively, the determining element 56 may be configured to enable the incoming message to be processed by the proxy 46 at operation 116. However, if either of the address identifier or the device identifier of the incoming message fails to match a registered address identifier and its associated registered device identifier, respectively, the determining element 56 may be configured to ignore the incoming message at operation 118.

Figure 5:
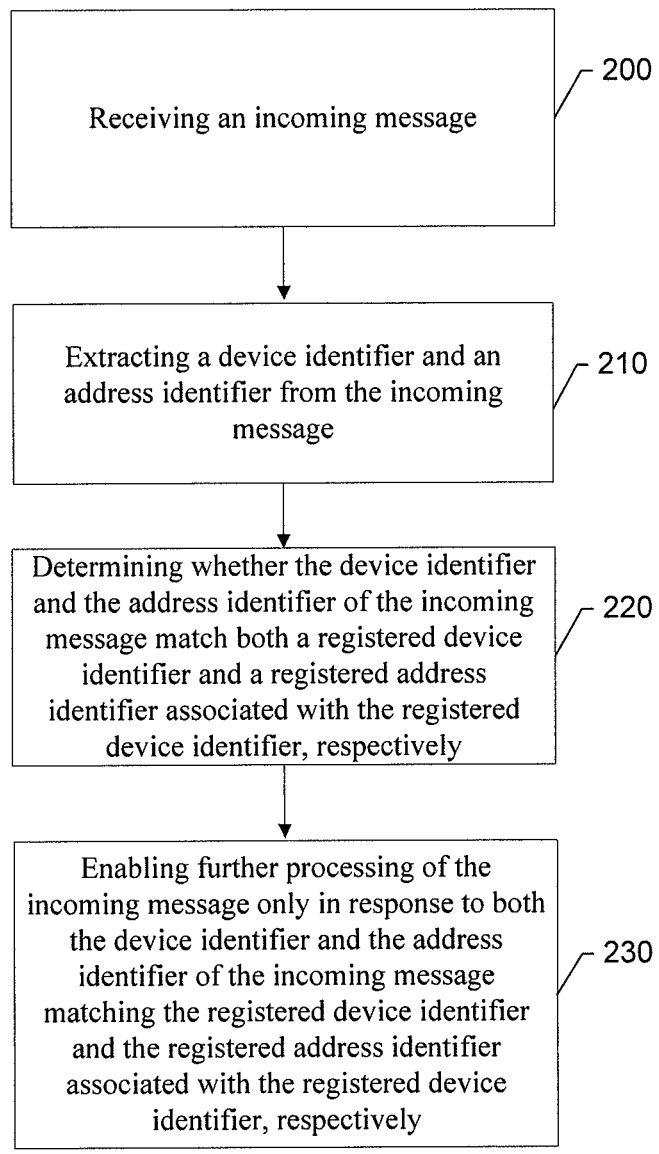
FIG. 5 is a flowchart according to an exemplary method and program product for providing authentication of subscriber communications at a network server according to an exemplary embodiment of the present invention.

FIG. 5 is a flowchart according to an exemplary method and program product for providing authentication of subscriber communications at a network server according to an exemplary embodiment of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of providing authentication of subscriber communications at a network server, as shown in FIG. 5, may include receiving an incoming message at operation 200. At operation 210, a device identifier and an address identifier may be extracted from the incoming message. A determination may be made as to whether the device identifier and the address identifier of the incoming message match both a registered device identifier and a registered address identifier associated with the registered device identifier, respectively, at operation 220. In an exemplary embodiment, the method may further include enabling further processing of the incoming message only in response to both the device identifier and the address identifier of the incoming message matching the registered device identifier and the registered address identifier associated with the registered device identifier, respectively, at operation 230. In another exemplary embodiment, operation 200 may further include performing a determination regarding the type of the incoming message and, determining whether the device identifier and the address identifier of the incoming message match both the registered device identifier and the registered address identifier associated with the registered device identifier, respectively, only if the incoming message is not a registration message. In such a situation, if the incoming message is a registration message, the method may further include storing the device identifier and the address identifier of the incoming message separately as one of registered device identifiers and one of registered address identifiers, respectively, and determining whether the device identifier of the incoming message has been previously stored in a database of recognized devices.

Many modifications and other embodiments of the inventions set forth herein will come to mind to one skilled in the art to which these embodiments pertain having the benefit of the teachings presented in the foregoing descriptions and the associated drawings. For example, while embodiments have been described in conjunction with confirmation of registration in conjunction with the exchange of SIP messages, other embodiments of the present invention can be employed in conjunction with other services and/or the exchange of other types of messages. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for processing communications at a server for a server application comprising:
    receiving at the server incoming messages from a device, wherein each incoming message is directed to a particular service, and wherein the server is directly associated with providing the particular service of the incoming messages;
    determining whether each incoming message is a registration message, or a non-registration message;
    extracting, from each incoming message, a device identifier and an address identifier, both the device identifier and the address identifier associated with the device;
    for each incoming message that is the registration message:
        identifying an authenticated device identifier previously associated with the extracted address identifier;
        comparing the extracted device identifier with the authenticated device identifier previously associated with the extracted address identifier; and
        storing the extracted device identifier and the extracted address identifier as a registered device identifier and a registered address identifier, respectively, only upon a match between the authenticated device identifier and the extracted device identifier; and
    for each incoming message that is the non-registration message:
        determining at the server whether the extracted device identifier and the extracted address identifier of the non-registration message match both the registered device identifier and the registered address identifier associated with the registered device identifier, respectively; and
        enabling further processing of the non-registration message at the server for the particular service only in response to both the extracted device identifier and the extracted address identifier matching the registered device identifier and the registered address identifier associated with the registered device identifier, respectively;
    wherein the receiving, extracting, determining, and enabling operations are specific to each incoming message and are separate from network authentication operations that provide network access.

2. A method according to claim 1, wherein, if an incoming message of the incoming messages is the registration message, the method further comprises:
    determining whether the device identifier of the incoming message has been previously stored in a database of recognized devices.

3. A method according to claim 2, wherein, if the device identifier has been previously stored in the database of recognized devices, the comparing step comprises:
    determining the authenticated device identifier corresponding to the address identifier of the incoming message; and
    determining whether the device identifier of the incoming message matches the authenticated device identifier.

4. A method according to claim 3, further comprising storing the device identifier and the address identifier of the incoming message as associated registered device and address identifiers, respectively, if the device identifier of the incoming message matches the authenticated device identifier.

5. A method according to claim 1, wherein extracting the device identifier from each incoming message comprises extracting a mobile device number (MDN) or mobile identification number (MIN) of a device sending the incoming messages, and extracting the address identifier from each incoming message comprises extracting a source internet protocol (IP) address of the device sending the incoming messages.

6. A method according to claim 1, wherein the identifying and comparing steps comprises:
    identifying a previously received message having an address identifier that matches the extracted address identifier; and
    comparing the extracted device identifier to the device identifier associated with the previously received message as the authenticated device identifier.

7. A method according to claim 6, wherein the previously received message is a protocol message.

8. A method according to claim 7, wherein the protocol message is a session initiation protocol message.

9. A method according to claim 1, wherein the server authenticates each incoming message that is the non-registration message based on the extracted device identifier and the extracted address identifier, regardless of a validity of the extracted device identifier of the non-registration message, such that the non-registration message is ignored unless the server authenticates the non-registration message.

10. A computer program product for processing communications at a server for a server application, the computer program product comprising at least one non-transitory computer-readable storage medium having computer-readable program code portions stored therein, the computer-readable program code portions comprising:
    a first executable portion for receiving at the server incoming messages from a device, wherein each incoming message is directed to a particular service, and wherein the server is directly associated with providing the particular service of the incoming messages;
    a second executable portion for determining whether each incoming message is a registration message, or a non-registration message;
    a third executable portion for extracting a device identifier and an address identifier, both the device identifier and the address identifier associated with the device, from each incoming message;

a fourth executable portion for identifying, for the registration message, an authenticated device identifier previously associated with the extracted address identifier and for comparing, for the registration message, the extracted device identifier with the authenticated device identifier previously associated with the extracted address identifier;

a fifth executable portion for storing, for the registration message, the extracted device identifier and the extracted address identifier as a registered device identifier and a registered address identifier, respectively, only upon a match between the authenticated device identifier and the extracted device identifier;

a sixth executable portion for determining at the server, for the non-registration message, whether the extracted device identifier and the extracted address identifier of the non-registration message match both the registered device identifier and the registered address identifier associated with the registered device identifier, respectively; and a seventh executable portion for enabling, for the non-registration message, further processing of the non-registration message at the server for the particular service only in response to both the extracted device identifier and the extracted address identifier of the non-registration message matching the registered device identifier and the registered address identifier associated with the registered device identifier, respectively;

wherein the receiving, extracting, determining, and enabling operations are specific to each incoming message and are separate from network authentication operations that provide network access.

11. A computer program product according to claim 10, wherein, if an incoming message of the incoming messages is the registration message, the fourth executable portion includes determining whether the device identifier of the incoming message has been previously stored in a database of recognized devices.

12. A computer program product according to claim 11, wherein, if the device identifier has been previously stored in the database of recognized devices, the computer program product further comprises:

a seventh executable portion for determining the authenticated device identifier corresponding to the address identifier of the incoming message; and an eighth executable portion for determining whether the device identifier of the incoming message matches the authenticated device identifier.

13. A computer program product according to claim 12, further comprising a ninth executable portion for storing the device identifier and the address identifier of the incoming message as associated registered device and address identifiers, respectively, if the device identifier of the incoming message matches the authenticated device identifier.

14. A computer program product according to claim 10, wherein the second executable portion includes instructions for extracting a mobile device number (MDN) or mobile identification number (MIN) of a device sending the incoming messages, and extracting the address identifier from each incoming message comprises extracting a source internet protocol (IP) address of the device sending the incoming messages.

15. An apparatus for processing communications at a server for a server application comprising:

a determining element configured to (1) receive at the server incoming messages from a device, wherein each incoming message is directed to a particular service, and wherein the server is directly associated with providing the particular service of the incoming message and (2) determine whether each incoming message is a registered message or a non-registered message;

an identification extractor in communication with the determining element and configured to extract a device identifier and an address identifier, both the device identifier and the address identifier associated with the device, from each incoming message, wherein, the determining element is further configured to identify, at the server for each incoming message that is the registered message, an authenticated device identifier previously associated with the extracted address identifier, determine whether the authenticated device identifier previously associated with the extracted address identifier matches the extracted device identifier, and store the extracted device identifier and the extracted address identifier as a registered device identifier and an address identifier, respectively, only upon a match between the extracted device identifier and the authenticated device identifier;

wherein the determining element is further configured to determine at the server, for each incoming message that is the non-registration message, whether the extracted device identifier and the extracted address identifier of the non-registration message match both the registered device identifier and the registered address identifier associated with the registered device identifier, respectively;

wherein the determining element is further configured to enable further processing of the non-registration message at the server for the particular service only in response to both the extracted device identifier and the extracted address identifier of the non-registration message matching the registered device identifier and the registered address identifier associated with the registered device identifier, respectively;

wherein the receiving, extracting, determining, and enabling operations are specific to each incoming message and are separate from network authentication operations that provide network access.

16. An apparatus according to claim 15, wherein the determining element is further configured, in response to an incoming message of the incoming messages being the registration message, to:

determine whether the device identifier of the incoming message has been previously stored in a database of recognized devices.

17. An apparatus according to claim 15, wherein the determining element is further configured to store the device identifier and the address identifier of an incoming message of the incoming messages as associated registered device and address identifiers, respectively, if the device identifier of the incoming message matches the authenticated device identifier.

18. An apparatus according to claim 15, wherein the determining element is configured to extract the device identifier from each incoming message by extracting a mobile device number (MDN) or mobile identification number (MIN) of a device sending the incoming messages, and to extract the address identifier from each incoming message by extracting a source internet protocol (IP) address of the device sending the incoming messages.

* * * * *